US007769545B2

(12) United States Patent
Lomask et al.

(10) Patent No.: US 7,769,545 B2
(45) Date of Patent: Aug. 3, 2010

(54) METHOD FOR DETERMINING GEOLOGICAL INFORMATION RELATED TO A SUBSURFACE VOLUME OF INTEREST

(75) Inventors: Jesse Lomask, San Ramon, CA (US); James Rickett, Oakland, CA (US); Julian Clark, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 263 days.

(21) Appl. No.: 12/029,196

(22) Filed: Feb. 11, 2008

(65) Prior Publication Data

US 2009/0204331 A1 Aug. 13, 2009

(51) Int. Cl.
*G01V 1/28* (2006.01)
(52) U.S. Cl. ............................. 702/14; 367/72; 367/73
(58) Field of Classification Search ............... 702/5, 702/14, 16; 703/2, 10; 367/69, 72–73
See application file for complete search history.

(56) References Cited

U.S. PATENT DOCUMENTS

| 5,251,184 | A | * | 10/1993 | Hildebrand et al. | 367/72 |
| 5,615,171 | A | * | 3/1997 | Hildebrand | 367/72 |
| 6,640,190 | B2 | * | 10/2003 | Nickel | 702/14 |
| 6,708,118 | B2 | | 3/2004 | Stark | |
| 6,850,845 | B2 | | 2/2005 | Stark | |
| 6,853,922 | B2 | | 2/2005 | Stark | |
| 2008/0015784 | A1 | * | 1/2008 | Dorn et al. | 702/16 |
| 2009/0157322 | A1 | * | 6/2009 | Levin | 702/16 |

OTHER PUBLICATIONS

Bienati, N., et al., Automatic Horizon Picking Algorithms for Multidimensional Data, EAGE 61$^{st}$ Conference and Technical Exhibition—Helsinki, Finland, Jun. 7-11, 1999.
Bienati, N., et al., Horizon picking for multidimensional data: an integrated approach, SBGf, SBGf35999, Dip. Elettronica e informazione, pp. 1-2.
Bienati, N., et al., Multidimensional Wavefront Estimation from Differential Delays, IEEE Transactions on Geoscience and Remote Sensing, vol. 39, No. 3, Mar. 2001, pp. 655-664.
Bienati, N., et al., Traveltime Picking in 3D Data Volumes, Eage 60$^{th}$ Conference and Technical Exhibition, Leipzig, Germany, Jun. 8-12, 1998.

(Continued)

*Primary Examiner*—Hal D Wachsman
*Assistant Examiner*—Mary C Baran
(74) *Attorney, Agent, or Firm*—Carlos L. Hanze

(57) ABSTRACT

A method of determining geological information related to a subsurface volume. In one embodiment, the method comprises obtaining a seismic information related to a subsurface volume; determining a horizon volume that automatically maps the seismic information into a flattened volume, wherein one axis of the flattened volume corresponds to chronostratigraphic time, and wherein horizons represented by the seismic information are automatically accounted for in the horizon volume, and are shifted by the horizon volume into the flattened volume to be substantially planar and substantially perpendicular to the axis of the flattened volume that corresponds to chronostratigraphic time; determining a derivative of the horizon volume with respect to chronostratigraphic time; and determining geological information related to the subsurface volume based on the derivative of the horizon volume with respect to chronostratigraphic time.

36 Claims, 3 Drawing Sheets

OTHER PUBLICATIONS

Blinov, A., et al., Reconstruction of 3-D Horizons From 3-D Seismic Datasets, IEEE Transactions on Geoscience and Remote Sensing, vol. 43, No. 6, Jun. 2005, pp. 1421-1431.

Ghiglia, D., et al., Two-Dimensional Phase Unwrapping Theory, Algorithms, and Software, Goldstein's Branch Cut Algorithm, pp. v-vii, pp. 107-117.

Ghiglia, D.C., et al., Robust two-dimensional weighted and unweighted phase unwrapping that uses fast transforms and iterative methods, Optical Society of America, vol. 11, No. 1, Jan. 1994, pp. 107-117.

Lomask, J. et al., Flattening without picking, Geophysics, vol. 71, No. 4 (Jul.-Aug. 2006), pp. P13-P20.

Lomask, J., et al., Flattening without picking, Stanford Exploration Project, Report 112, Nov. 11, 2002, pp. 141-151.

Lomask, J., et al., Volumetric flattening: an interpretation tool, The Leading Edge, Jul. 2007, pp. 888-897.

Lomask, J., Flattening 3-D data cubes in complex geology, Stanford Exploration Project, Report 113, Jul. 8, 2003, pp. 247-261.

Lomask, J., Flattening 3-D seismic cubes without picking.

Lomask, J., Seismic Volumetric Flattening and Segmentation, A Dissertation submitted to the Department of Geophysics and the Committee on Graduate Studies of Stanford University in Partial Fulfillment of the Requirements for the Degree of Doctor of Philosophy, Oct. 2006, pp. ii-xx, pp. 1-134.

Stark, T., Relative geologic time (age) volumes—Relating every seismic sample to a geologically reasonable horizon, The Leading Edge, Sep. 2004, pp. 928-932.

Wheeler, H., Time-Stratigraphy, Bulletin of the American Association of Petroleum Geologists, vol. 42, No. 5 (May 1958), pp. 1047-1063.

Zeng, H., et al., Stratal slicing, Part I: Realistic 3-D seismic model, Geophysics, vol. 63, No. 2 (Mar.-Apr. 1998), pp. 502-513.

Zeng, H., et al. Stratal slicing, Part II: Real 3-D seismic data, Geophysics, vol. 63, No. 2 (Mar.-Apr. 1998), pp. 514-522.

\* cited by examiner

METHOD FOR DETERMINING GEOLOGICAL INFORMATION RELATED TO A SUBSURFACE VOLUME OF INTEREST

RELATED APPLICATIONS

This application is related to U.S. patent application Ser. No. 12/029,216 entitled "Method for Indexing a Subsurface Volume for the Purpose of Inferring Geologic Information," and filed herewith, the contents of which are incorporated into this disclosure in their entirety.

FIELD OF THE INVENTION

The invention relates to systems and methods for determining geological information related to subsurface volumes of interest. In particular, the invention involves determining a metric related to a rate at which strata present within a subsurface volume of interest were formed, and, in some instances, deriving further geological information from the derived metric.

BACKGROUND OF THE INVENTION

Techniques for determining information related to a rate of deposition at which strata present within a subsurface volume of interest were formed are known. However, these techniques generally require manual analysis of seismic data related to the subsurface volume of interest (e.g., manual picking of horizons within the seismic data) and/or imprecise computation, and typically result in data that is sparsely sampled and/or low resolution. As such the usefulness of implementing the determined information in the derivation of further geological information is impaired.

SUMMARY

One aspect of the invention relates to a computer-implemented method of determining information related to the formation of strata within a subsurface volume. In one embodiment, the method comprises obtaining seismic information related to a subsurface volume that represents geological formations within the subsurface volume, wherein the parameters of the obtained seismic information include (i) a two-dimensional position in a surface plane, and (ii) a seismic time; analyzing obtained seismic information to automatically identify a set of horizons present within the subsurface volume that are represented by the obtained seismic information; determining a horizon volume from the seismic information, wherein the horizon volume maps the obtained seismic information into a flattened volume such that in the flattened volume, each of the identified horizons are shifted to be substantially coplanar with a surface defined by the horizon volume as an estimate of a single chronostratigraphic time, wherein the coordinates of the flattened volume are (i) a two-dimensional position in the surface plane, and (ii) a metric related to chronostratigraphic time; and determining, within the horizon volume, the derivative of seismic time with respect to chronostratigraphic time for a given chronostratigraphic time, thereby providing a strata formation metric related to a rate at which strata present at a surface in the flattened volume that corresponds to the given chronostratigraphic time was being formed at the given chronostratigraphic time.

Another aspect of the invention relates to a method of determining geological information related to a subsurface volume. In one embodiment, the method comprises obtaining seismic information related to a subsurface volume, wherein the seismic information represents horizons present in the subsurface volume; determining a horizon volume that automatically maps the seismic information into a flattened volume, wherein one axis of the flattened volume corresponds to chronostratigraphic time, and wherein horizons represented by the seismic information are automatically accounted for in the horizon volume, and are shifted by the horizon volume into the flattened volume to be substantially planar and substantially perpendicular to the axis of the flattened volume that corresponds to chronostratigraphic time; determining a derivative of the horizon volume with respect to chronostratigraphic time; and determining geological information related to the subsurface volume based on the derivative of the horizon volume with respect to chronostratigraphic time.

Another aspect of the invention relates to a method of determining geological information related to a subsurface volume. In one embodiment, the method comprises obtaining seismic data, wherein the seismic data is generated based on the reception of seismic impulses reflected from horizons formed within a subsurface volume; determining seismic information from the seismic data, wherein the seismic information describes the three-dimensional position of the horizons contained within the subsurface volume; determining a horizon volume that maps the seismic information into a flattened volume, wherein one axis of the flattened volume corresponds to chronostratigraphic time, and wherein the horizon volume maps the seismic information into the flattened volume such that substantially all of the horizons described in the seismic information are individually shifted to be substantially planar and substantially perpendicular to the axis of the flattened volume that corresponds to chronostratigraphic time; determining a derivative of the horizon volume with respect to chronostratigraphic time; and determining geological information related to the subsurface volume based on the derivative of the horizon volume with respect to chronostratigraphic time.

Another aspect of the invention relates to a computer-implemented method of determining information related to the formation of strata within a subsurface volume. In one embodiment, the method comprises obtaining seismic information related to a subsurface volume that represents geological formations within the subsurface volume, wherein the coordinates of the obtained seismic information are (i) a two-dimensional position in a surface plane, and (ii) seismic depth; analyzing the seismic information to automatically identify a set of horizons present within the subsurface volume that are represented by the seismic information; determining a horizon volume from the seismic information, wherein the horizon volume maps the obtained seismic information into a flattened volume such that in the flattened volume, each of the identified horizons are shifted to be substantially coplanar with a surface defined by the horizon volume as an estimate of a single chronostratigraphic time, wherein the coordinates of the flattened volume are (i) a two-dimensional position in the surface plane, and (ii) a metric related to chronostratigraphic time; and determining, within the horizon volume, the derivative of seismic depth with respect to chronostratigraphic time for a given chronostratigraphic time, thereby providing a strata formation metric related to a rate at which strata present at a surface in the flattened volume that corresponds to the given chronostratigraphic time was being formed at the given chronostratigraphic time.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Reflection seismology (or seismic reflection) is a method of exploration geophysics that uses the principles of seismology to estimate the properties of a subsurface volume of interest within the Earth's subsurface from seismic waves directed to and reflected from the subsurface volume of interest. The method generally requires a source of seismic waves, such as explosives (e.g., dynamite/Tovex), a specialized air gun, a Vibroseis, and/or other sources. The source is used to introduce seismic waves into the subsurface volume of interest (usually at the surface), and data is acquired by an array of seismometers (usually disposed at the surface) that detect reflections of the seismic waves generated by the source as they arrive at the surface of the subsurface volume. The data acquired by the seismometers is then processed (e.g., migrated, etc.) to form a seismic data cube, which represents geological formations present within the subsurface volume at an array of data points within the subsurface volume. Since the data points within the seismic data cube are typically highly spatially sampled, the seismic data cube is effectively an image of the strata present in the subsurface volume of interest. It should be appreciated that in some instances, the seismic data can include fewer than the three dimensions of the seismic data cube discussed herein (e.g., one or two dimensional seismic data), and/or it can include a time dimension as well as spatial dimensions.

Figure 1:
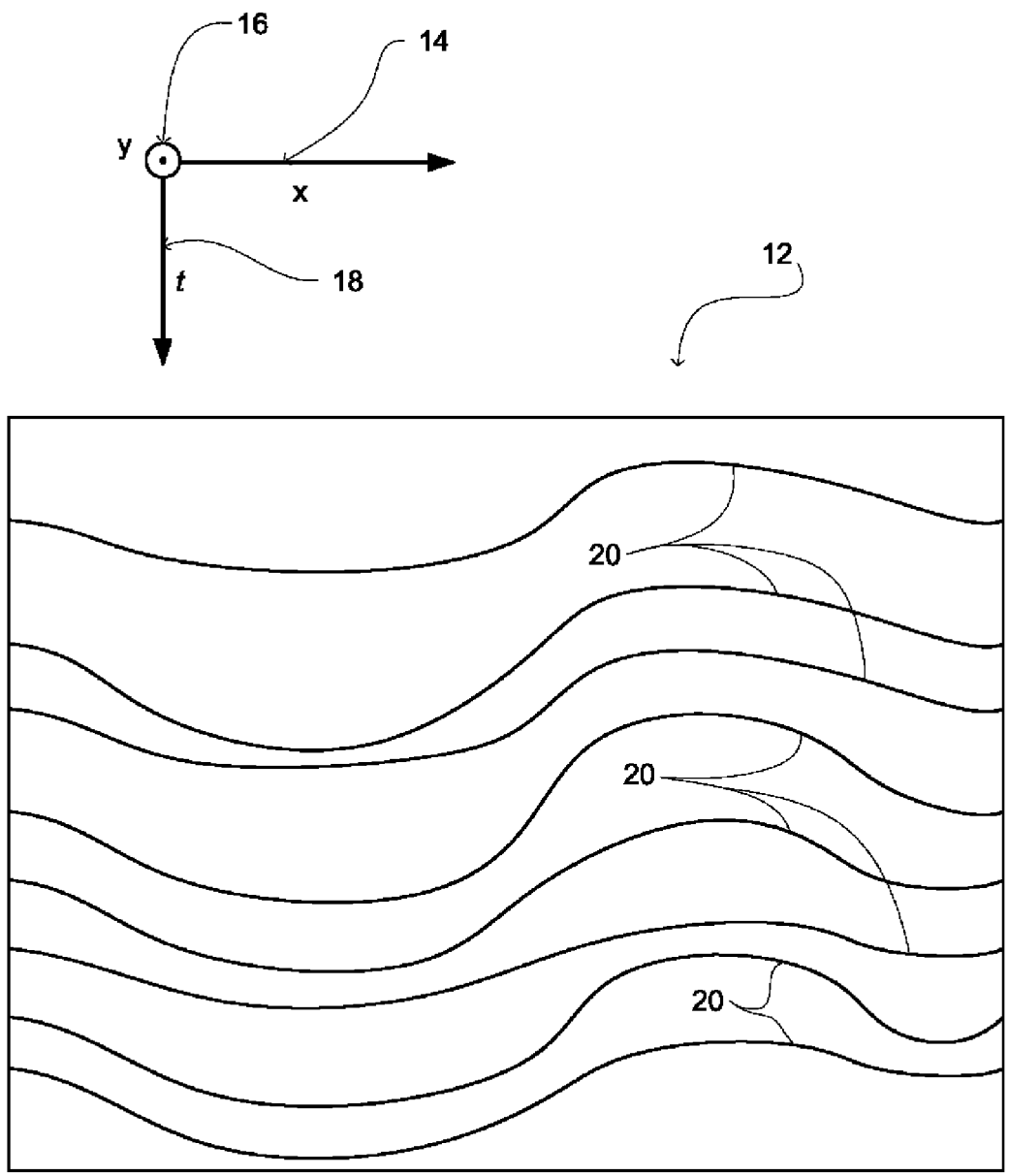
FIG. 1 illustrates a graphical representation of seismic information related to a subsurface volume of interest that represents geological formations within subsurface volume of interest, according to one embodiment of the invention.

By way of illustration, FIG. 1 illustrates an elevation view of a graphical representation of seismic information related to a subsurface volume of interest 12 that represents geological formations within subsurface volume of interest 12 (e.g., a seismic data cube obtained from performing reflection seismology on subsurface volume of interest 12). While the graphical representation provided by FIG. 1 depicts the seismic information as being contiguous, typically seismic information will represent geological formations within subsurface volume of interest 12 at an array of data points within subsurface volume of interest 12. However, due to the high spatial sampling of the seismic information (e.g., the proximity of the data points), the information can be represented as contiguous for illustrative purposes. Further, although FIG. 1 only provides a two-dimensional view of the graphical representation of the seismic information, this is purely for illustrative purposes, and it should be appreciated that a three-dimensional view could be provided with an additional dimension into and out of the plane of the figure. For instance, in one embodiment, the parameters of the seismic information that represents geological formations within subsurface volume of interest 12 are a two-dimensional position in a surface plane of subsurface volume of interest 12 (e.g., an x-axis 14, and a y-axis 16 that is orthogonal to the plane of FIG. 1) and a metric related to the seismic depth of subsurface volume of interest 12 (e.g., a t-axis 18, where t represents seismic time). The metric related to the seismic depth of subsurface volume of interest 12 may be a seismic time or a seismic depth. Seismic time is related to the time it takes seismic waves to travel between a point in subsurface volume of interest 12 and the surface.

As can be seen in FIG. 1, subsurface volume of interest 12 includes a plurality of horizons 20. A horizon is a surface formed at a boundary between two layers of differing composition within the strata of subsurface volume of interest 12. Since horizons 20 represent boundary changes in the composition of the strata of subsurface volume of interest 12, it is assumed for analysis purposes that each horizon 20 represents a surface within subsurface volume of interest 12 that was deposited at a common chronostratigraphic time. This is reasonable because the impetus for a composition change in the strata being deposited in one area of subsurface volume of interest 12 would likely be an impetus for a similar change in the composition of strata being deposited in another area of subsurface volume of interest 12. Particularly where the boundaries indicating such a change in composition for both areas connect and/or are of similar depth within subsurface volume of interest 12.

At a given point on a horizon (or some other surface in subsurface volume of interest 12 that correspond to a single chronostratigraphic time), the horizon (or other surface) can be described in terms of its location (e.g., x, y, t coordinates) and its "dip." The "dip" is a measurement of the orientation of the horizon with respect to the horizontal (or some other planar surface, typically perpendicular to the "strike"). For example, in FIG. 1 the dip of a given one of horizons 20 can be characterized by two components, an x-dip, or the angle of the given horizon 20 with respect to x-axis 14, and a y-dip, or the angle of the given horizon 20 with respect to y-axis 16.

As is shown in FIG. 1, horizons 20 within subsurface volume of interest 12 generally have undulations and/or discontinuities. Some of these undulations and/or discontinuities may be caused by various phenomena associated with the deposition of the strata. These phenomena include, for example, variable sedimentation rates, variable erosion rates, surface undulations at the time of deposition, variable lithologic composition, and/or other phenomena. The undulations and/or discontinuities, in some cases, may be the result of various subsurface forces that impact the shape of horizons 20. These phenomena may include, for example, seismic activity, volcanic activity, ground water flow, subsurface sediment flow (e.g., salt movement), non-uniform loading, variable compaction rates, variable rates of diagenetic consolidation, tectonically driven deformation (e.g., folding and/or faulting), and/or other phenomena.

Figure 2:
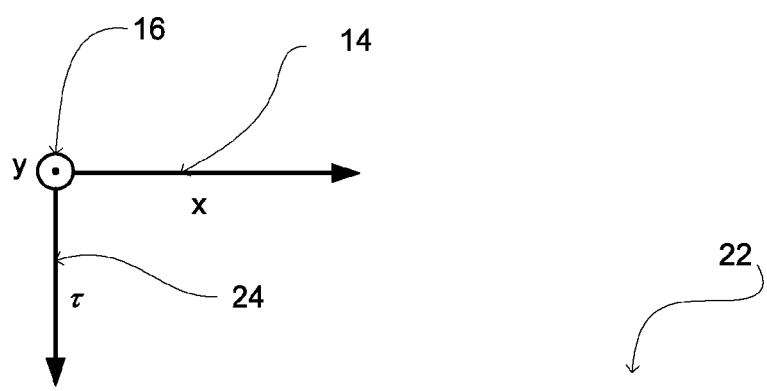
FIG. 2 illustrates an elevation view of a graphical representation of a flattened volume that corresponds to a subsurface volume of interest, according to one embodiment of the invention.
Figure 2:
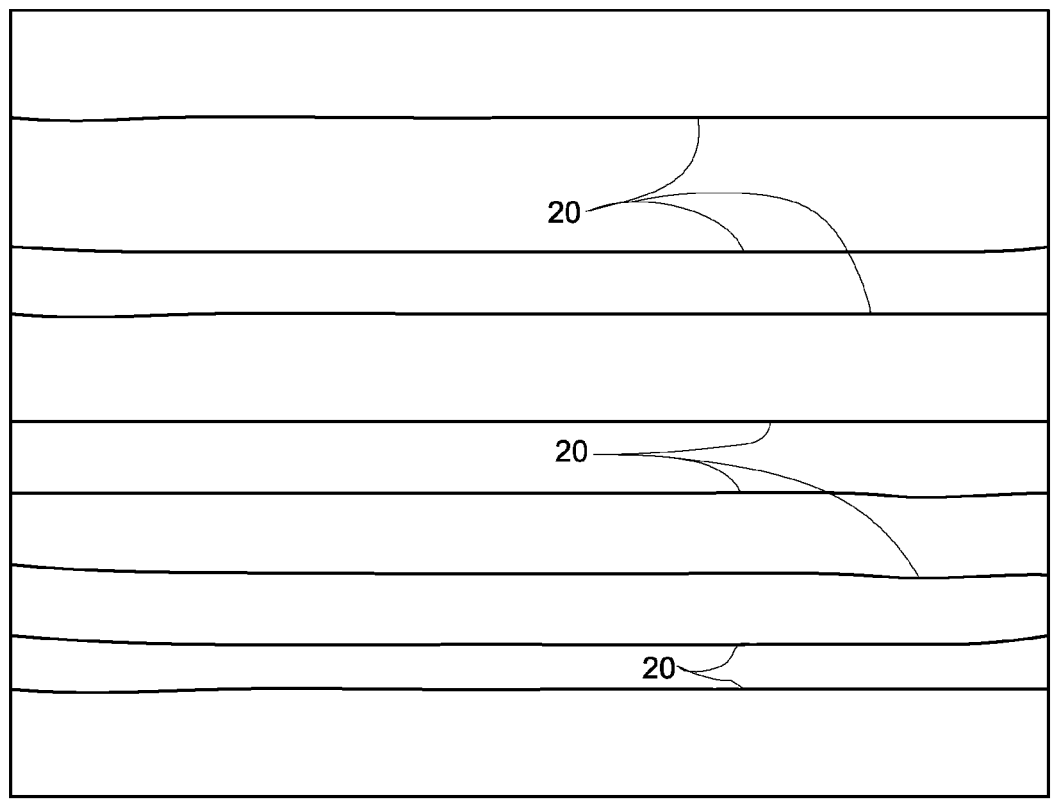

By analyzing seismic information that represents geological formations (e.g., horizons 20, layers of strata between horizons 20, etc.) within subsurface volume of interest 12, geological information related to subsurface volume of interest 12 can be determined. One technique employed to analyze such information is generally referred to as "flattening." By way of example, FIG. 2 illustrates an elevation view of a graphical representation of flattened volume 22 that corresponds to subsurface volume of interest 12. In flattened volume 22, some or all of horizons 20 present in subsurface volume of interest 12 are reshaped to correspond to some common shape. The common shape is coplanar with a surface defined by the horizon volume as an estimate of a single chronostratigraphic time of deposition. In flattened volume 22 show in FIG. 2, horizons 20 have been reshaped to be coplanar with a surface that is planar and horizontal.

Since each of horizons 20 is considered to represent a surface within subsurface volume of interest 12 that was deposited at a common chronostratigraphic time, the vertical axis of flattened volume 22 (illustrated in FIG. 2 and referred to hereafter as chronostratigraphic time axis 24) becomes a metric related to chronostratigraphic time of deposition, rather than seismic depth. More specifically, the parameters of flattened volume 22 are a two-dimensional position in the surface plane of flattened volume 22, and a metric related to information related to chronostratigraphic time of deposition.

Although in FIG. 2, horizons 20 have been flattened to be substantially coplanar with a surface that is planar and orthogonal to chronostratigraphic time axis 24, this should not be viewed as limiting. In some instances, horizons 20 may be flattened to be substantially coplanar with a surface that is one or both of non-planar and/or non-orthogonal to chronostratigraphic time axis 24 (e.g., flattened to a surface that corresponds to the shape of one of horizons 20 in subsurface volume of interest 12).

By viewing the obtained seismic information in the form of flattened volume 22, an interpreter (e.g., a user, a computer, etc.) can view geological features within subsurface volume of interest 12 as they were laid down originally. For example, after flattening, an interpreter could view the preserved features of an entire flood plain complete with meandering channels in a single image.

One technique for flattening obtained seismic information is described, for example, in "*Flattening without picking*," Lomask et al., *Stanford Exploration Project*, Report 112, Nov. 11, 2002, pgs. 141-151; "*Flattening 3-D data cubes in complex geology*," Lomask, *Stanford Exploration Project*, Report 113, Jul. 8, 2003, pgs. 247-261; "*Flattening without picking*," Lomask et al, *Geophysics*, Vol. 71, No. 4 (July-August 2006), pgs. 13-20; and "*Volumetric flattening: an interpretation tool*," Lomask et al, *The Leading Edge*, July 2007, pgs. 888-897 (referred to collectively hereafter as "Lomask"). These publications are incorporated into this disclosure in their entirety. As is discussed in Lomask, when the flattening technique described therein is applied to obtained seismic information, the result includes a "horizon volume." As used herein, a horizon volume is a data set that maps the obtained seismic information into flattened volume 22, and vice versa. As such, in one embodiment, the horizon volume can be conceptualized as a function that provides a position within the seismic information (e.g., (x,y,t)) that corresponds to a given location in flattened volume 22 as a function of its position within flattened volume 22 (e.g., (x,y,τ)). Since the two-dimensional location in a surface plane (e.g., x,y coordinates in FIGS. 1 and 2) do not change between subsurface volume of interest 12 and flattened volume 22, the designation of t for a given location (x,y,τ) in flattened volume 22 enables the information from the designated t with the same two-dimensional surface position of the given location in subsurface volume of interest 12 (e.g., the same x and y) to be mapped into flattened volume 22 at the given location within flattened volume 22.

As was mentioned above, generally, seismic information will represent geological formations within subsurface volume of interest 12 at an array of data points within subsurface volume of interest 12. Therefore, another manner of conceptualizing the horizon volume is as an index of the data points in the obtained seismic information that are included in flattened volume 22, where the index designates a position of the data point in the seismic information related to subsurface volume of interest 12 that should be mapped into a given location of flattened volume 22.

Figure 3:
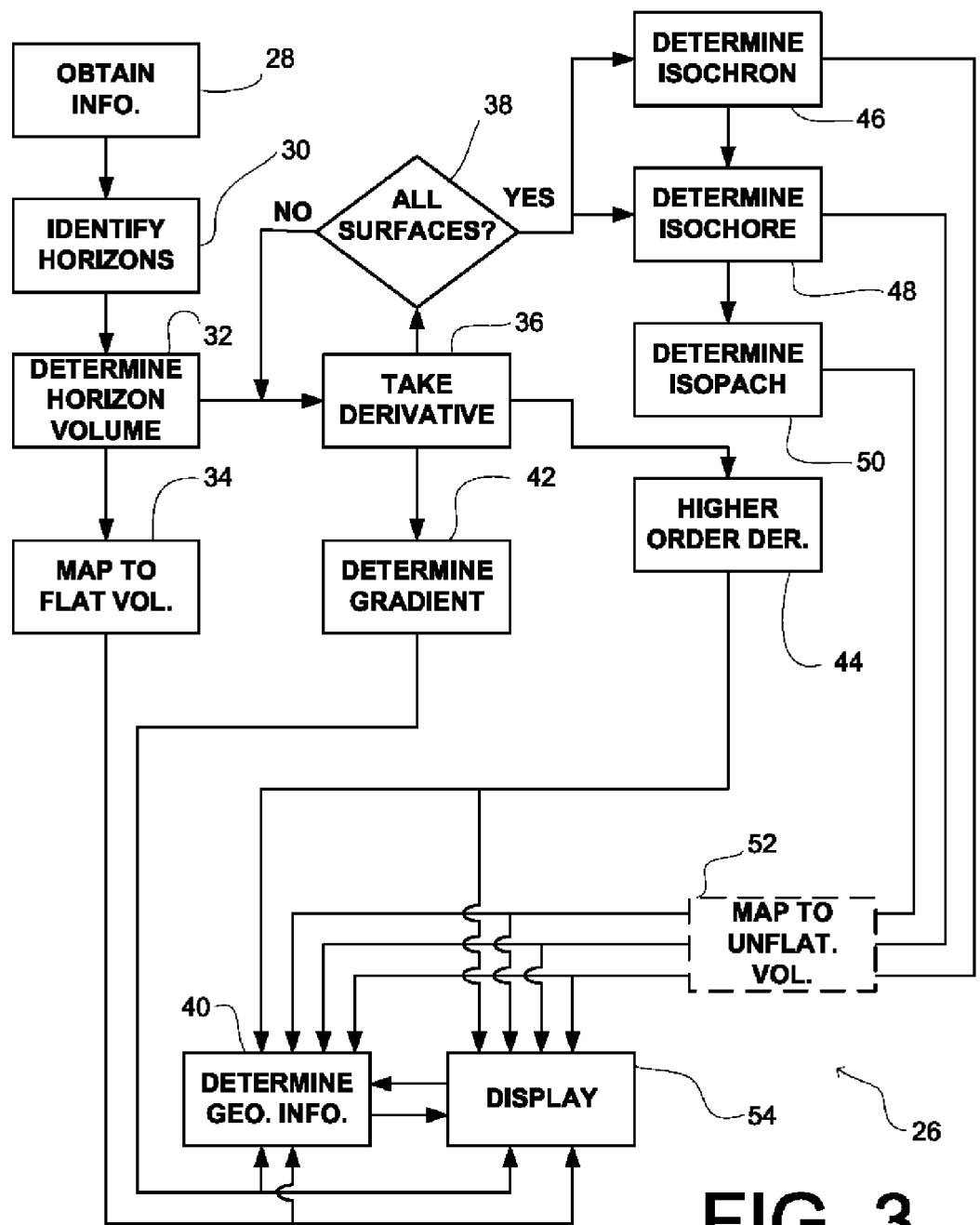
FIG. 3 illustrates a method of determining a horizon volume for a subsurface volume of interest, and processing the horizon volume to derive geological information related to the subsurface volume of interest, in accordance with one embodiment of the invention.

FIG. 3 illustrates a method 26 of determining a horizon volume and processing the horizon volume to extract geological information related to a subsurface volume of interest. In the description of method 26 and one or more of its operations below, specific reference is made to the flattening technique described in Lomask. However, this should not be viewed as limiting. Instead, method 26 should be appreciated as being usable with a variety of different flattening techniques. Further, the particular arrangement of the operations of method 26 illustrated in FIG. 3 and described hereafter is not intended to be limiting. In some implementations, various ones of the operations could be performed in an order other than the one set forth (or concomitantly with other ones of the operations), various ones of the operations may be combined with others and/or be omitted altogether, and/or various additional operations may be added without departing from the scope of the disclosure, as should be appreciated.

At an operation 28 of method 26, seismic information is obtained that is related to a subsurface volume of interest that represents geological formations within the subsurface volume of interest. In one embodiment, the parameters of the obtained seismic information include a two-dimensional position in a surface plane, and a metric related to seismic depth. In some instances, the seismic information obtained at operation 28 represents geological formations present within the subsurface volume of interest at an array of data points within the subsurface volume. In one embodiment, the seismic information obtained at operation 28 includes a seismic data cube that represents the three-dimensional positions of geological formations present within the subsurface volume of interest.

At an operation 30, the seismic information obtained at operation 28 is analyzed to identify horizons present in the subsurface volume of interest. In one embodiment, identifying horizons at operation 30 includes interpreting individual horizons represented within the obtained seismic information by associating each of the data points in the seismic information obtained at operation 28 that is on a given one of the identified horizons with the given horizon. For example, the horizons can be interpreted automatically according to the technique described in Lomask.

In one embodiment, operation 30 identifies horizons present in the subsurface volume of interest with a density with respect to seismic depth/time (e.g., along t-axis 18 shown in FIG. 1 and described above) that is greater than a predetermined density threshold. The predetermined density threshold may be configurable by a user, based on one or more parameters related to the subsurface volume of interest, and/or based on parameters of the obtained seismic information). An example of a predetermined density threshold may be at least one horizon for each seismic period in a seismic time volume. An alternative horizon interpretation strategy would be to interpret every minimum or maximum or the seismic trace as a horizon.

At an operation 32, a horizon volume is determined that maps the seismic information obtained at operation 28 into a flattened volume such that in the flattened volume, each of the horizons identified at operation 30 are ordered according to chronostratigraphic time of deposition and are shifted to be substantially coplanar with a surface defined by the horizon volume as an estimate of a single chronostratigraphic time. As such, the coordinates of the flattened volume are a two-dimensional position in the surface plane, and a metric related to chronostratigraphic time of deposition. In one embodiment, the horizon volume maps the seismic information obtained at operation 28 into the flattened volume by specifying values of seismic time/depth that correspond to positions within the flattened volume.

In one embodiment, the metric related to chronostratigraphic time of deposition is a relative measurement of chronostratigraphic time. This will typically be the case, since the horizon volume orders the horizons identified at operation 30 according to chronostratigraphic time of deposition, but does not specify an actual value for chronostratigraphic time of deposition. However, in some instances, a user may specify a more absolute scale for the chronostratigraphic times of deposition to be applied to the relative metric provided initially by the horizon volume.

In one embodiment, the surface defined by the horizon volume as an estimate of a single chronostratigraphic time has a planar shape and is orthogonal to an axis that corresponds to the metric related to chronostratigraphic time. In one embodiment, the surface defined by the horizon volume as an estimate of a single chronostratigraphic time has a shape that corresponds to the shape(s) of one or more of the horizons identified at operation 28.

At an operation 34, the seismic information obtained at operation 28 is mapped into the flattened space according to the horizon volume. As is illustrated in FIG. 2, and discussed above, this results in each of the horizons identified at operation 30 being shifted to be substantially coplanar with the surface defined by the horizon volume to be an estimate of a single chronostratigraphic time of deposition.

At an operation 36, a derivative is taken of the horizon volume determined at operation 32 with respect to the metric related to chronostratigraphic time. For example, where the seismic information obtained at operation 28 is parameterized by seismic depth, the derivative taken at operation 36 is the derivative of seismic depth specified by the horizon volume with respect to chronostratigraphic time. As another example, where the seismic information obtained at operation 28 is parameterized by seismic time, the derivative taken at operation 36 is the derivative of seismic time specified by the horizon volume with respect to the metric related to chronostratigraphic time. In one embodiment, the derivative taken at operation 36 with respect to the metric related to chronostratigraphic time is taken within the horizon volume along a surface that corresponds to a single chronostratigraphic time of deposition. One example of such a surface would be a horizon identified at operation 30. However, other surfaces that correspond to a single chronostratigraphic time may also exist within the horizon volume.

At an operation 38, a determination is made as to whether a derivative of the horizon volume with respect to the metric related to chronostratigraphic time has been taken along each of a predetermined set of surfaces within the horizon volume that correspond to single chronostratigraphic times. In one embodiment, the predetermined set of surfaces includes at least the horizons identified at operation 30. In one embodiment, the predetermined set of surfaces excludes one or more of the horizons identified at operation 30. One or more of the frequency of the surfaces with respect to chronostratigraphic time, the number of surfaces, the frequency of the surfaces with respect to seismic depth/time, and/or other parameters of the set of surfaces may be configurable by users and/or may be determined automatically (e.g., based on the identification of horizons at operation 30, based on the seismic information obtained at operation 28, etc.).

If the determination is made at operation 38 that the derivative of the horizon volume with respect to the metric related to chronostratigraphic time has not been determined at each surface in the predetermined set of surfaces within the horizon volume, method 26 returns to operation 36, and the derivative of the horizon volume with respect to the metric related to chronostratigraphic time is taken along another one of the surfaces included within the predetermined set of surfaces. If the determination is made at operation 38 that the derivative of the horizon volume with respect to the metric related to chronostratigraphic time has been determined along each surface in the predetermined set of surfaces, then method 26 proceeds to an operation 40.

The derivative taken at operation 36 for a given point in the horizon volume can be conceptualized as describing the rate at which the subsurface volume was getting "thicker" (e.g., the subsurface volume is increasing along the t-axis 18 in FIG. 1) at the point in the subsurface volume that corresponds to the given point in the horizon volume. During the formation of the subsurface volume of interest, the subsurface volume of interest gets "thicker" as additional strata is deposited/formed. As such, the derivative(s) taken at operation 36 provide a strata formation metric related to a rate at which strata present in the subsurface volume of interest was formed. The strata formation metric is related to, for example, a sedimentation rate, syndepositional growth rate, one or more diagenetic processes, seismic velocity, and/or other factors related to the formation of strata within the subsurface volume of interest.

At operation 40, geological information related to the subsurface volume of interest is determined from the derivative (s) of the horizon volume taken with respect to the metric related to chronostratigraphic time. Operation 40 may be performed automatically (e.g., according to some predetermined algorithm), manually (e.g., by a user analyzing one or more derivatives determined at operation 36), and/or by some combination of automatic and/or manual analysis. In one embodiment, the geological information includes one or more reservoir properties of the subsurface volume of interest (e.g., a porosity, a net-to-gross, a shale volume fraction, a permeability, a lithology, a depositional facies, etc.). As should be appreciated from the description of operations 42, 44, 46, 48, 50, 52, and/or 54, method 26 may include further operations to facilitate the determination of geological information from the derivative(s) of the horizon volume taken at operation 32.

In one embodiment, method 26 includes an operation 42, at which a gradient of the derivative of the horizon volume with respect to the metric related to chronostratigraphic time is determined. In some instances, the gradient determined at operation 42 is for this derivative along a surface within the horizon volume that correspond to individual chronostratigraphic times of deposition. In some instances, the gradient determined at operation 42 for the derivative of the horizon volume with respect to the metric related to chronostratigraphic time is determined over a three-dimensional region (e.g., a three-dimensional region within the flattened volume, a three-dimensional region within the subsurface volume of interest, etc.). In some instances, the gradient determined at operation 42 may be determined perpendicular to, or parallel to, a particular geological formation of interest. In some instances, the gradient determined at operation 42 may include the gradient projected along radial lines spreading outward from a particular geological formation of interest. The geological formation of interest, and/or its boundaries, may be identified manually by a user and/or automatically identified. The determination of the gradient (or gradients) at operation 42 may facilitate the determination of geological information related to paleo-channel gradient, paleo-flow direction and rate, paleo-topography, and/or other geological information.

In one embodiment, method 26 includes an operation 44, at which a higher order derivative of the horizon volume is taken with respect to the metric related to chronostratigraphic time of deposition (higher than the first order derivative taken at operation 36). In one embodiment, operation 44 includes taking the higher order derivative along one or more surfaces in the horizon volume that correspond to individual chronostratigraphic times. The determination of the higher order derivative at operation 44 may facilitate the determination of geological information related to the timing of the onset and termination of periods of higher sedimentation.

In one embodiment, method 26 includes an operation 46, at which an isochron volume is determined from the derivatives taken at operation 36. For example, in some instances where the seismic information obtained at operation 28 is parameterized by seismic time (e.g., rather than seismic depth), the isochron volume is determined by associating individual positions on the surfaces for which the derivative of the horizon volume is determined at operation 36 with the corresponding values for the derivative of the horizon volume with respect to the metric related to chronostratigraphic time that are determined at operation 36. As such, the isochron volume determined at operation 46 describes the derivative of seismic time specified by the horizon volume with respect to the metric related to chronostratigraphic time as a function of location within the flattened volume.

In one embodiment, method 26 comprises an operation 48, at which an isochore volume is determined from the derivatives taken at operation 36. For example, in some instances where the seismic information obtained at operation 28 is parameterized by seismic depth (e.g., rather than seismic time), the isochore volume is determined by associating individual positions on the surfaces for which the derivative of the horizon volume is determined at operation 36 with the corresponding values for the derivative of the horizon volume with respect to the metric related to chronostratigraphic time that are determined at operation 36. As such, the isochore volume determined at operation 46 describes the derivative of seismic depth specified by the horizon volume with respect to the metric related to chronostratigraphic time as a function of location within the flattened volume. As another example, in some instances where the seismic information obtained at operation 28 is parameterized by seismic time (e.g., rather than seismic depth), the isochore volume is determined based on the isochron volume determined at operation 46. For instance, the isochore volume may be determined by multiplying the values of the derivative of seismic time specified by the horizon volume with respect to the metric related to chronostratigraphic time included in the isochron volume, determined at operation 46, by one half of the local seismic interval velocity of the subsurface volume (or, by any scalar multiple of the local seismic interval of velocity where the metric related to chronostratigraphic time is relative, unscaled, chronostratigraphic time).

In one embodiment, method 26 includes an operation 50, at which an isopach volume is determined from the flattened volume derived at operation 34 and the isochore volume derived at operation 48. In order to determine the isopach volume, the isochore values included within the isochore volume derived at operation 48 are multiplied by the cosine of local dip. As was discussed above, the local dip of a point on a given horizon within the flattened volume (which was implemented to determine the isochore volume) describes the orientation of the given horizon with respect to the horizontal in the unflattened subsurface volume of interest. Techniques for determining local dip within subsurface volumes are well-developed. Accordingly, in one embodiment, the local dip of points within the flattened volume are computed from the seismic information obtained at operation 28, and are then mapped into the flattened volume so that the isochore values determined at operation 48 can be multiplied by the cosine of local dip to determine the isochron volume.

In one embodiment, method 26 includes an operation 52, at which one or more of the isochron volumes derived at operation 46, the isochore volume derived at operation 48, and/or the isopach volume derived at operation 50 are mapped, according to the horizon volume, back onto the parameters of the seismic information obtained at operation 28 (e.g., back into the unflattened subsurface volume of interest). As such operation 52 provides one or more volumes that include the isochron, isochore, or isopach values derived at operation 46, 48, or 50, respectively, and represents the three dimensional shape and position of the horizons identified at operation 30.

In one embodiment, method 26 includes an operation 54 at which information is displayed to users (e.g., via an electronic display). The information displayed at operation 54 may include information derived at one or more of operations 32, 34, 36, 42, 44, 46, 48, 50, and/or 52. As such, the information displayed at operation 54 may enable the users to perform, and/or monitor or control the performance operation 40. In some instances, operation 54 may include the display of geological information (other than, or in addition to, the geological information determined at one or more of operations 32, 34, 36, 42, 44, 46, 48, 50, and/or 52) determined at operation 40. In such instances, operation 54 effects the display of the results (or partial results) of operation 40.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of determining information related to the formation of strata within a subsurface volume, the method comprising:

obtaining computer-readable seismic information related to a subsurface volume that represents geological formations within the subsurface volume, wherein the parameters of the obtained seismic information include (i) a two-dimensional position in a surface plane, and (ii) a seismic time;

analyzing, with a computer, obtained seismic information to automatically identify a set of horizons present within the subsurface volume that are represented by the obtained seismic information;

determining, with the computer, a horizon volume from the seismic information, wherein the horizon volume maps the obtained seismic information into a flattened volume such that in the flattened volume, each of the identified horizons are shifted to be substantially coplanar with a surface defined by the horizon volume as an estimate of a single chronostratigraphic time, wherein the coordinates of the flattened volume are (i) a two-dimensional position in the surface plane, and (ii) a metric related to chronostratigraphic time; and determining, with the computer, and within the horizon volume, the derivative of seismic time with respect to chronostratigraphic time for a given chronostratigraphic time, thereby providing a strata formation metric related to a rate at which strata present at a surface in the flattened volume that corresponds to the given chronostratigraphic time was being formed at the given chronostratigraphic time.

2. The method of claim 1, wherein the spacing between the set of horizons in the flattened volume is related to the chronostratigraphic time between deposition of the set of horizons.

3. The method of claim 1, wherein the derivative of seismic time with respect to chronostratigraphic time for the horizon volume is determined for a plurality of chronostratigraphic times.

4. The method of claim 3, wherein an isochron volume is determined that describes the strata formation metric of a location as a function of its position within the flattened volume.

5. The method of claim 3, further comprising determining an isochore volume that describes the strata formation metric multiplied by some scalar multiple of local seismic interval velocity of a location as a function of its position within the flattened volume.

6. The method of claim 1, further comprising implementing the determined strata formation metric to determine an isopach volume that corresponds to the subsurface volume.

7. The method of claim 1, wherein the given chronostratigraphic time corresponds to a horizon within the subsurface volume.

8. The method of claim 1, further comprising mapping the derivative of seismic time with respect to chronostratigraphic time for the horizon volume at the given chronostratigraphic time back into unmapped coordinates of the subsurface volume.

9. The method of claim 1, further comprising implementing the derivative of seismic time with respect to chronostratigraphic time for the horizon volume at the given chronostratigraphic time to infer geological information related to the subsurface volume.

10. The method of claim 9, wherein the inferred geological information comprises one or more reservoir properties of the subsurface volume.

11. The method of claim 10, wherein the one or more reservoir properties comprise one or more of a porosity, a net-to-gross, a shale volume fraction, a lithology, a depositional facies, or a permeability.

12. The method of claim 1, wherein the derivative of seismic time with respect to chronostratigraphic time determined is the first order derivative.

13. The method of claim 1, wherein the derivative of seismic time with respect to chronostratigraphic time determined is of an order higher than the first order.

14. The method of claim 1, further comprising determining the gradient of the derivative of seismic time with respect to chronostratigraphic time along the surface in the flattened volume that corresponds to the given chronostratigraphic time.

15. The method of claim 14, wherein the gradient of the derivative of seismic time with respect to chronostratigraphic time is determined parallel, perpendicular, or radially with respect to a geological feature of interest.

16. The method of claim 1, further comprising generating a display that graphically conveys the strata formation metric to a viewer.

17. A method of determining geological information related to a subsurface volume, the method comprising:
    obtaining computer-readable seismic information related to a subsurface volume, wherein the seismic information represents horizons present in the subsurface volume;
    determining, with a computer, a horizon volume that automatically maps the seismic information into a flattened volume, wherein one axis of the flattened volume corresponds to chronostratigraphic time, and wherein horizons represented by the seismic information are automatically accounted for in the horizon volume, and are shifted by the horizon volume into the flattened volume to be substantially planar and substantially perpendicular to the axis of the flattened volume that corresponds to chronostratigraphic time;
    determining, with the computer, a derivative of the horizon volume with respect to chronostratigraphic time; and
    determining, with the computer, geological information related to the subsurface volume based on the derivative of the horizon volume with respect to chronostratigraphic time.

18. The method of claim 17, wherein the derivative of the horizon volume with respect to chronostratigraphic time provides a strata formation metric related to a rate at which strata present within the subsurface volume were formed.

19. The method of claim 17, wherein the determined geological information comprises one or more reservoir properties of the subsurface volume.

20. The method of claim 19, wherein the one or more reservoir properties comprise one or more of a porosity, a net-to-gross, a shale volume fraction, a lithology, a depositional facies, or a permeability.

21. The method of claim 17, wherein determining a derivative of the horizon volume with respect to chronostratigraphic time comprises determining, for each of a plurality of horizons within the subsurface volume, the derivative of the horizon volume with respect to chronostratigraphic time along the horizons.

22. The method of claim 21, wherein an isochron volume is determined that describes the derivative of the horizon volume with respect to chronostratigraphic time of a location as a function of its position within the flattened volume.

23. The method of claim 21, wherein an isochore volume is determined that describes the derivative of the horizon volume with respect to chronostratigraphic time of a location as a function of its position within the flattened volume.

24. The method of claim 21, further comprising implementing the determined derivatives of the horizon volume with respect to chronostratigraphic time to determine an isopach volume that corresponds to the subsurface volume.

25. The method of claim 17, further comprising generating a display that graphically conveys one or both of the derivative of the horizon volume with respect to chronostratigraphic time and/or the geological information to a viewer.

26. A method of determining geological information related to a subsurface volume, the method comprising:
    obtaining computer-readable seismic data, wherein the seismic data is generated based on the reception of seismic impulses reflected from horizons formed within a subsurface volume;

determining, with a computer, seismic information from the seismic data, wherein the seismic information describes the three-dimensional position of the horizons contained within the subsurface volume;

determining, with the computer, a horizon volume that maps the seismic information into a flattened volume, wherein one axis of the flattened volume corresponds to chronostratigraphic time, and wherein the horizon volume maps the seismic information into the flattened volume such that substantially all of the horizons described in the seismic information are individually shifted to be substantially planar and substantially perpendicular to the axis of the flattened volume that corresponds to chronostratigraphic time;

determining, with the computer, a derivative of the horizon volume with respect to chronostratigraphic time; and determining, with the computer, geological information related to the subsurface volume based on the derivative of the horizon volume with respect to chronostratigraphic time.

27. The method of claim 26, wherein determining the horizon volume comprises automatically identifying and ordering horizons that are described in the seismic information according to chronostratigraphic time without manual interaction to identify, select, and/or order the horizons.

28. The method of claim 26, wherein the derivative of the horizon volume with respect to chronostratigraphic time provides a strata formation metric related to a rate at which strata present within the subsurface volume was formed.

29. The method of claim 26, wherein the determined geological information comprises one or more reservoir properties of the subsurface volume.

30. The method of claim 29, wherein the one or more reservoir properties comprise one or more of a porosity, a net-to-gross, a shale volume fraction, a lithology, a depositional facies, or a permeability.

31. The method of claim 30, wherein an isochore volume is determined that describes the derivative of the horizon volume with respect to chronostratigraphic time of a location as a function of its position within the flattened volume.

32. The method of claim 30, further comprising implementing the derivative of the horizon volume with respect to chronostratigraphic time to determine an isopach volume that corresponds to the subsurface volume.

33. The method of claim 26, wherein determining a derivative of the horizon volume with respect to chronostratigraphic time comprises determining, for each of a plurality of horizons within the subsurface volume, the derivative of the horizon volume with respect to chronostratigraphic time along each of the plurality of the horizons.

34. The method of claim 33, wherein an isochron volume is determined that describes the derivative of the horizon volume with respect to chronostratigraphic time of a location as a function of its position within the flattened volume.

35. The method of claim 26, further comprising generating a display that graphically conveys one or both of the derivative of the horizon volume with respect to chronostratigraphic time and/or the geological information to a viewer.

36. A computer-implemented method of determining information related to the formation of strata within a subsurface volume, the method comprising:

obtaining computer-readable seismic information related to a subsurface volume that represents geological formations within the subsurface volume, wherein the coordinates of the obtained seismic information are (i) a two-dimensional position in a surface plane, and (ii) seismic depth;

analyzing, with a computer, the seismic information to automatically identify a set of horizons present within the subsurface volume that are represented by the seismic information;

determining, with the computer, a horizon volume from the seismic information, wherein the horizon volume maps the obtained seismic information into a flattened volume such that in the flattened volume, each of the identified horizons are shifted to be substantially coplanar with a surface defined by the horizon volume as an estimate of a single chronostratigraphic time, wherein the coordinates of the flattened volume are (i) a two-dimensional position in the surface plane, and (ii) a metric related to chronostratigraphic time; and determining, with the computer, and within the horizon volume, the derivative of seismic depth with respect to chronostratigraphic time for a given chronostratigraphic time, thereby providing a strata formation metric related to a rate at which strata present at a surface in the flattened volume that corresponds to the given chronostratigraphic time was being formed at the given chronostratigraphic time.

* * * * *